United States Patent  
Lee et al.

(10) Patent No.: US 9,614,219 B2  
(45) Date of Patent: *Apr. 4, 2017

(54) COMPOSITE CATHODE ACTIVE MATERIAL HAVING IMPROVED POWER CHARACTERISTICS, AND SECONDARY BATTERY, BATTERY MODULE, AND BATTERY PACK INCLUDING THE SAME

(71) Applicant: LG Chem, Ltd., Seoul (KR)

(72) Inventors: Min Hee Lee, Gyeonggi-do (KR); Jung Hwan Park, Daejeon (KR); Ki Young Kwon, Daejeon (KR)

(73) Assignee: LG Chem, Ltd. (KR)

( * ) Notice: Subject to any disclaimer, the term of this patent is extended or adjusted under 35 U.S.C. 154(b) by 212 days.

This patent is subject to a terminal disclaimer.

(21) Appl. No.: 14/463,833

(22) Filed: Aug. 20, 2014

(65) Prior Publication Data

US 2014/0356715 A1    Dec. 4, 2014

Related U.S. Application Data

(63) Continuation of application No. 13/864,586, filed on Apr. 17, 2013, now Pat. No. 8,840,815, which is a (Continued)

(30) Foreign Application Priority Data

Dec. 7, 2011    (KR) .................. 10-2011-0130207

(51) Int. Cl.  
*H01B 1/08*  (2006.01)  
*H01M 4/13*  (2010.01)  
(Continued)

(52) U.S. Cl.  
CPC .......... *H01M 4/366* (2013.01); *C01G 45/125* (2013.01); *C01G 45/1228* (2013.01);  
(Continued)

(58) Field of Classification Search  
CPC .. H01B 1/00; H01B 1/08; H01M 4/13; H01M 4/131  
See application file for complete search history.

(56) References Cited

U.S. PATENT DOCUMENTS 4,101,716 A   7/1978  Horowitz et al.  
6,660,432 B2  12/2003 Paulsen et al.  
(Continued)

FOREIGN PATENT DOCUMENTS

EP    1819008 A1    8/2007  
EP    2128915 A1    12/2009  
(Continued)

OTHER PUBLICATIONS

International Search Report dated Feb. 25, 2013 for Application No. PCT/KR2012/010575.  
(Continued)

*Primary Examiner* — Mark Kopec  
(74) *Attorney, Agent, or Firm* — Lerner, David, Littenberg, Krumholz & Mentlik, LLP

(57) ABSTRACT

Provided is a composite cathode active material including layered lithium manganese oxide and lithium-containing metal oxide. Also, the present invention provides a secondary battery, a battery module, and a battery pack which have improved power characteristics by including the composite cathode active material.

7 Claims, 3 Drawing Sheets

Related U.S. Application Data continuation of application No. PCT/KR2012/010575, filed on Dec. 6, 2012.

(51) Int. Cl.

| | | |
|---|---|---|
| *H01M 4/36* | (2006.01) | |
| *H01M 4/131* | (2010.01) | |
| *H01M 4/505* | (2010.01) | |
| *H01M 4/525* | (2010.01) | |
| *H01M 4/62* | (2006.01) | |
| *H01M 4/48* | (2010.01) | |
| *H01M 4/52* | (2010.01) | |
| *C01G 45/12* | (2006.01) | |
| *C01G 53/00* | (2006.01) | |
| *H01M 10/052* | (2010.01) | |
| *H01M 4/02* | (2006.01) | |
| *H01M 4/485* | (2010.01) | |

(52) U.S. Cl.
CPC .............. *C01G 53/42* (2013.01); *H01B 1/08* (2013.01); *H01M 4/131* (2013.01); *H01M 4/362* (2013.01); *H01M 4/364* (2013.01); *H01M 4/483* (2013.01); *H01M 4/505* (2013.01); *H01M 4/523* (2013.01); *H01M 4/525* (2013.01); *H01M 4/624* (2013.01); *C01P 2004/82* (2013.01); *H01M 4/485* (2013.01); *H01M 10/052* (2013.01); *H01M 2004/028* (2013.01); *H01M 2220/20* (2013.01); *Y02E 60/122* (2013.01); *Y02T 10/7011* (2013.01); *Y10S 903/907* (2013.01)

(56) References Cited

U.S. PATENT DOCUMENTS

| | | | |
|---|---|---|---|
| 8,518,582 | B2 | 8/2013 | Park et al. |
| 8,840,815 | B2 * | 9/2014 | Lee ................ H01M 4/131 252/521.1 |
| 2003/0010631 | A1 | 1/2003 | Anzai |
| 2010/0028776 | A1 | 2/2010 | Park et al. |
| 2011/0244324 | A1 | 10/2011 | Jang |
| 2011/0311869 | A1 | 12/2011 | Oh et al. |
| 2011/0311872 | A1 | 12/2011 | Oh et al. |
| 2012/0217452 | A1 | 8/2012 | Park et al. |
| 2012/0241666 | A1 | 9/2012 | Hong et al. |
| 2012/0244432 | A1 | 9/2012 | Park et al. |
| 2012/0270106 | A1 | 10/2012 | Todorov et al. |
| 2012/0292561 | A1 | 11/2012 | Sasaoka et al. |

FOREIGN PATENT DOCUMENTS

| | | | |
|---|---|---|---|
| JP | 2003-017060 | A | 1/2003 |
| JP | 2007-317534 | A | 12/2007 |
| JP | 2008-037749 | A | 2/2008 |
| JP | 2009-224097 | A | 10/2009 |
| JP | 2009-266712 | A | 11/2009 |
| JP | 2009266791 | A | 11/2009 |
| JP | 2010-108873 | A | 5/2010 |
| JP | 2010-282874 | A | 12/2010 |
| JP | 2011-171012 | A | 9/2011 |
| JP | 2013-520782 | A | 6/2013 |
| JP | 2013-520783 | A | 6/2013 |
| JP | 2014-505975 | A | 3/2014 |
| KR | 20090082790 | A | 7/2009 |
| KR | 20100130973 | A | 12/2010 |
| KR | 20110063388 | A | 6/2011 |
| WO | 2011065408 | A1 | 6/2011 |
| WO | 2011-089958 | A1 | 7/2011 |

OTHER PUBLICATIONS

Search report from European Application No. 12856250.1, dated Mar. 27, 2015.

W. Lu et al, "In Situ Thermal Study of $Li_{1+x}[Ni_{1/3}Co_{1/3}Mn_{1/3}]_{1-x}O_2$ Using Isothermal Micro-clorimetric Techniques," Journal of the Electrochemical Society, vol. 153, No. 11, p. A2147, Sep. 15, 2006.

Michael M. Thackeray et al, "$Li_2MnO_3$-stabilized $LiMO_2$ (M=Mn, Ni, Co) electrodes for lithium-ion batteries," Journal of Materials Chemistry, Royal Society of Chemistry, GB, vol. 17, No. 30, pp. 3112-3125, Aug. 14, 2007.

I. Belharouak et al., "Safety Characteristics of $LiNi_{1/3}Mn_{1/3}O_2$ and $Ni(Ni_{0.8}Co_{0.15}Al_{0.05})O_2$ (Advanced Cathodes)," 209th ECS Meeting Abstract #124, copyright ECS, May 9, 2006.

Yu-juan Zhao, et al., "Progress of Research on the Li-rich Cathode Materials $xLi_2MnO_3(1-x)LiMO_2$ (M=Co, Fe, $Ni_{1/2}Mn_{1/2}$...) for Li-ion Batteries," Journal of Inorganic Materials, vol. 26, No. 7, pp. 673-679, Jul. 31, 2011.

* cited by examiner

COMPOSITE CATHODE ACTIVE MATERIAL HAVING IMPROVED POWER CHARACTERISTICS, AND SECONDARY BATTERY, BATTERY MODULE, AND BATTERY PACK INCLUDING THE SAME

CROSS REFERENCE TO RELATED APPLICATIONS

The present application is a continuation of U.S. patent application Ser. No. 13/864,586, filed Apr. 17, 2013, now U.S. Pat. No. 8,840,815, which is a continuation of PCT/KR2012/010575 filed Dec. 6, 2012, which claims the priority of Korean Patent Application No. 10-2011-0130207 filed on Dec. 7, 2011, in the Korean Intellectual Property Office, the disclosures of which are incorporated herein by reference.

TECHNICAL FIELD

The present invention relates to a composite cathode active material having improved power characteristics, and a secondary battery, a battery module, and a battery pack which include the same.

BACKGROUND ART

Recently, lithium secondary batteries have been used in various fields including portable electronic devices such as mobile phones, personal digital assistants (PDAs), and laptop computers. In particular, in line with growing concerns about environmental issues, research into lithium secondary batteries having high energy density and discharge voltage as a power source of an electric vehicle able to replace vehicles using fossil fuels such as gasoline vehicle and diesel vehicle, one of major causes of air pollution, have been actively conducted and some of the research are in a commercialization stage.

Meanwhile, in order to use a lithium secondary battery as a power source of the electric vehicle, the lithium secondary battery must maintain stable power in a wide state of charge (SOC) range along with high power.

An electric vehicle is classified as a typical electric vehicle (EV), battery electric vehicle (BEV), hybrid electric vehicle (HEV), or plug-in hybrid electric vehicle (PHEV) according to a type of the power source thereof.

However, since the typical electric vehicle (EV) and the series-type PHEV among the foregoing electric vehicles entirely depend on the battery rather than the engine in terms of driving of the vehicle, maintaining of stable power according to battery characteristics in a usable SOC range is a very important factor for driving safety in comparison to other types of electric vehicles, and a battery having a wide available SOC range is required.

Meanwhile, with respect to $LiCoO_2$, a typical cathode material of a high-capacity lithium secondary battery, practical limits of an increase in energy density and power characteristics have been reached. In particular, when $LiCoO_2$ is used in high energy density applications, oxygen in a structure of $LiCoO_2$ is discharged along with structural degeneration in a high-temperature charged state due to its structural instability to generate an exothermic reaction with an electrolyte in a battery and thus, it becomes a main cause of battery explosion.

In order to improve the safety limitation of $LiCoO_2$, uses of lithium-containing manganese oxides, such as layered crystal structure $LiMnO_2$ and spinel crystal structure $LiMn_2O_4$, and lithium-containing nickel oxide ($LiNiO_2$) have been considered, and a great deal of research into layered structure lithium manganese oxides, in which manganese (Mn) as an essential transition metal is added in an amount greater than those of other transition metals (excluding lithium) to layered lithium manganese oxide as a high-capacity material, has recently been conducted.

The lithium manganese oxide exhibits relatively large capacity and also exhibits relatively high power characteristics in a high SOC range. However, resistance may rapidly increase at an operating voltage limit, i.e., a low SOC range, and thus, power may rapidly decrease and initial irreversible capacity may be large.

Since there are such limitations in using typically known cathode active materials of lithium secondary batteries alone, use of a mixture formed therebetween may be required. In particular, in order to be used as a power source of medium and large sized devices, there is an urgent need for a lithium secondary battery having safety improved by exhibiting a uniform profile without a rapid voltage drop in an entire SOC range as well as having high capacity.

DISCLOSURE OF THE INVENTION

Technical Problem

The present invention provides a composite cathode active material having improved power characteristics in which stable power may be provided in a wide SOC range by mixing lithium manganese oxide and lithium-containing metal oxide having a high discharge potential.

The present invention also provides a secondary battery, a battery module, and a battery pack which include the composite cathode active material.

Technical Solution

According to an aspect of the present invention, there is provided a composite cathode active material including: a layered lithium manganese oxide represented by Chemical Formula 1 below; and a lithium-containing metal oxide represented by Chemical Formula 3 below,

  Chemical Formula 1

$a[Li_2MnO_3]\cdot(1-a)[LiM^1O_2]$ wherein, $0<a<1$ and $M^1$ is one or more metals selected from the group consisting of manganese (Mn), nickel (Ni), cobalt (Co), iron (Fe), chromium (Cr), vanadium (V), copper (Cu), zinc (Zn), titanium (Ti), aluminum (Al), magnesium (Mg), and boron (B); and

  Chemical Formula 3

$Li(Ni_xCo_yAl_z)O_2$ wherein, x, y, and z are each independently selected from a range of $0<x, y, z<1$, and $x+y+z=1$.

A mixing ratio of the layered lithium manganese oxide represented by Chemical Formula 1 and the lithium-containing metal oxide represented by Chemical Formula 3 may be in a weight ratio ranging from 99:1 to 50:50.

$M^1$ in Chemical Formula 1 of the layered lithium manganese oxide may include Mn, Ni, and Co.

x, y, and z in Chemical Formula 3 may be in ranges of 0.45 to 0.90, 0.05 to 0.35, and 0.005 to 0.20, respectively.

The composite cathode active material may further include one or more selected from the group consisting of lithium cobalt oxide; lithium nickel oxide; lithium manganese oxide; lithium cobalt-nickel oxide; lithium cobalt-manganese oxide; lithium manganese-nickel oxide; lithium cobalt-nickel-manganese oxide; and oxides having one or more other elements selected from the group consisting of Al, Mg, Ni, Co, Fe, Cr, V, Ti, Cu, B, calcium (Ca), Zn, zirconium (Zr), niobium (Nb), molybdenum (Mo), strontium (Sr), antimony (Sb), tungsten (W), and bismuth (Bi) substituted or doped therein.

According to another aspect of the present invention, there is provided a secondary battery including the composite cathode active material.

According to another aspect of the present invention, there is provided a battery module including the secondary battery.

According to another aspect of the present invention, there is provided a battery pack including the battery module.

The battery pack may be used as a power source of one or more medium and large sized devices selected from the group consisting of an electric vehicle (EV) including an electric car, a hybrid electric vehicle (HEV), and a plug-in hybrid electric vehicle (PHEV); an electric bike; an electric scooter; an electric golf cart; an electric truck; and an electric commercial vehicle.

Advantageous Effects

A composite cathode active material of the present invention may not only be non-toxic and economy in terms of costs, but may also provide stable power in a wide state of charge (SOC) range.

Also, power characteristics may be improved by including the composite cathode active material according to the present invention in a secondary battery, a battery module, and a battery pack.

MODE FOR CARRYING OUT THE INVENTION

Figure 1:
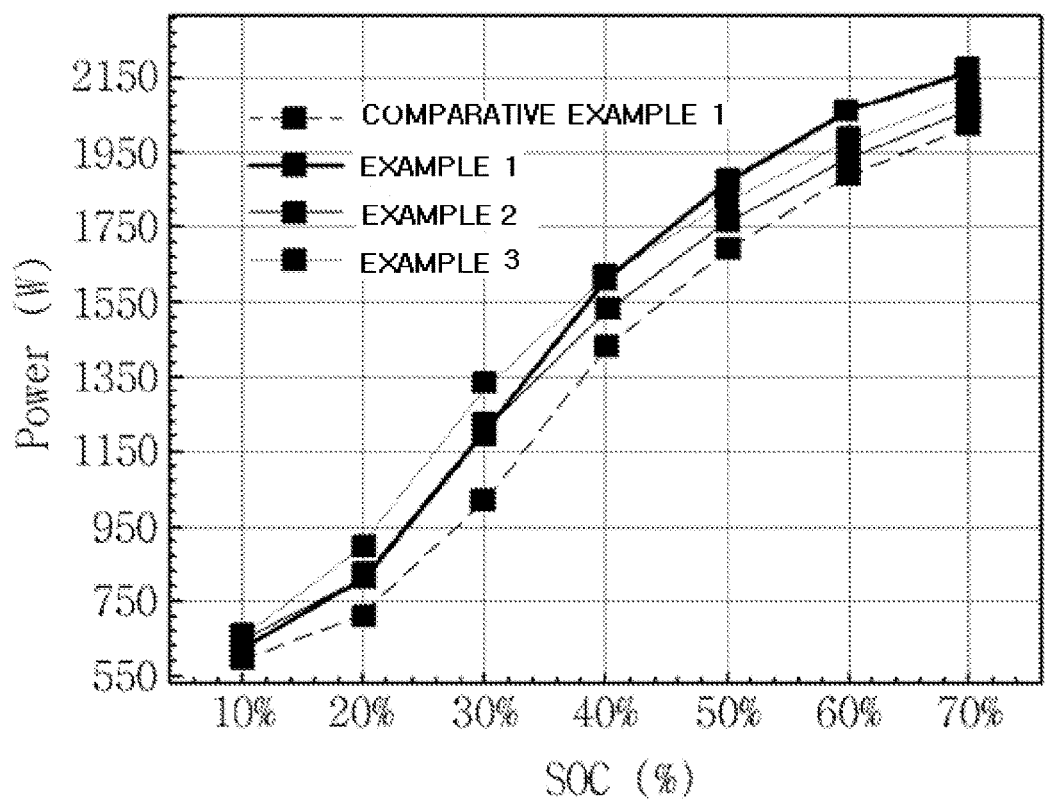
FIG. 1 is a graph showing power with respect to each state of charge (SOC) of cells according to Examples 1 to 3 and Comparative Example 1.

A composite cathode active material according to an embodiment of the present invention includes layered lithium manganese oxide represented by the following Chemical Formula 1 and lithium-containing metal oxide represented by the following Chemical Formula 3:

$a[Li_2MnO_3] \cdot (1-a)[LiM^1O_2]$  Chemical Formula 1 wherein, $0<a<1$ and $M^1$ is one or more metals selected from the group consisting of manganese (Mn), nickel (Ni), cobalt (Co), iron (Fe), chromium (Cr), vanadium (V), copper (Cu), zinc (Zn), titanium (Ti), aluminum (Al), magnesium (Mg), and boron (B); and

$Li(Ni_xCo_yAl_z)O_2$  Chemical Formula 3 wherein, x, y, and z are each independently selected from a range of $0<x, y, z<1$, and $x+y+z=1$.

Since the composite cathode active material according to the embodiment of the present invention includes the layered lithium manganese oxide represented by Chemical Formula 1 and the lithium-containing metal oxide represented by Chemical Formula 3, the composite cathode active material may not only be non-toxic and relatively inexpensive in comparison to $LiCoO_2$, but may also provide stable power in a wide state of charge (SOC) range.

However, in the case that the layered lithium manganese oxide represented by Chemical Formula 1 is used alone as a cathode active material, a secondary battery including the layered lithium manganese oxide exhibits a phenomenon in which powder decreases due to a rapid increase in resistance at a low SOC. Various explanations related to this phenomenon have been proposed, but generally, the phenomenon may be explained as below. That is, as expressed in the following reaction formulae, two lithium ions and two electrons are extracted with oxygen gas from $Li_2MnO_3$ constituting the layered lithium manganese oxide during initial charging at a high voltage of 4.5 V or more based on a cathode potential, but only one lithium ion and one electron are reversibly inserted into a cathode during discharging.

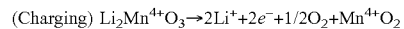

(Charging) $Li_2Mn^{4+}O_3 \rightarrow 2Li^+ + 2e^- + 1/2O_2 + Mn^{4+}O_2$

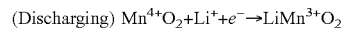

(Discharging) $Mn^{4+}O_2 + Li^+ + e^- \rightarrow LiMn^{3+}O_2$

Therefore, initial charge and discharge efficiency of the layered lithium manganese oxide represented by Chemical Formula 1 may be different according to a content of $Li_2MnO_3$ (value of a), but may be lower than that of a typical layered cathode active material, e.g., $LiCoO_2$, $LiMn_{0.5}Ni_{0.5}O_2$, or $LiMn_{0.33}Ni_{0.33}Co_{0.33}O_2$.

In this case, since a capacity of an anode must be over-designed in order to prevent precipitation of lithium at the anode during an initial cycle according to a large irreversible capacity of the layered lithium manganese oxide represented by Chemical Formula 1, an actual reversible capacity may be decreased. Also, with respect to a layered material, there may be limitations in terms of safety.

Therefore, in the present invention, the composite cathode active material including both the layered lithium manganese oxide represented by Chemical Formula 1 and the lithium-containing metal oxide represented by Chemical Formula 3 is provided, in order to not only address the foregoing limitations and maintain advantages of the layered lithium manganese oxide represented by Chemical Formula 1, but also to secure stable power in a wide SOC range.

According to an embodiment of the present invention, $M^1$ in Chemical Formula 1 may include Mn, Ni, and Co in order to provide economic advantages and a high-capacity secondary battery.

According to an embodiment of the present invention, a compound having a discharge potential higher than that of the layered lithium manganese oxide may be used as the lithium-containing metal oxide represented by Chemical Formula 3 in order to be mixed with the layered lithium manganese oxide represented by Chemical Formula 1 to overall increase the discharge potential.

That is, with respect to the composite cathode active material including the layered lithium manganese oxide represented by Chemical Formula 1 and the lithium-containing metal oxide represented by Chemical Formula 3 having a high discharge potential, since the discharge potential thereof may be overall increased in comparison to the case in which the layered lithium manganese oxide represented by Chemical Formula 1 is used alone, power may be stable in a wide SOC range and a phenomenon, in which resistance rapidly increases at a low SOC, may be mitigated.

More particularly, the discharge potential of the layered lithium manganese oxide represented by Chemical Formula 1 may be different according to a type of metal selected as $M^1$ of Chemical Formula 1, but may be about 3.5 V on the average. Therefore, the discharge potential of the lithium-containing metal oxide represented by Chemical Formula 3 may be 3.5 V or more, but the discharge potential thereof is not limited thereto.

In the composite cathode active material according to the embodiment of the present invention, a mixing ratio of the layered lithium manganese oxide represented by Chemical Formula 1 and the lithium-containing metal oxide represented by Chemical Formula 3 may be in a weight ratio ranging from 99:1 to 50:50. However, in the case that the lithium-containing metal oxide is mixed in a weight ratio of less than 1, stable power may not be secured in a wide SOC range, and in the case that the lithium-containing metal oxide is mixed in a weight ratio of greater than 50, an excessive amount of the lithium-containing metal oxide more expensive than the layered lithium manganese oxide is included and thus, the composite cathode active material may not be suitable for a large-capacity device in terms of costs.

A metal oxide represented by the following Chemical Formula 2 may be used as the lithium-containing metal oxide according to the present invention, but the present invention is not limited thereto.

$$LiM^2O_2 \qquad \text{Chemical Formula 2}$$

wherein, $M^2$ is one or more metals selected from the group consisting of Mn, Ni, Co, Fe, Cr, V, Cu, Zn, Ti, Al, Mg, and B.

In the present invention, the lithium-containing metal oxide represented by Chemical Formula 3, in which $M^2$ is Ni, Co, and Al among metal oxides represented by Chemical Formula 2, may be used.

According to an embodiment of the present invention, x, y, and z in Chemical Formula 3 may be in ranges of 0.45 to 0.90, 0.05 to 0.35, and 0.005 to 0.20, respectively. In the foregoing ranges, a discharge potential is in a range of 3 V to 4.4 V, sufficiently higher in comparison to that of the layered lithium manganese oxide represented by Chemical Formula 1.

One or more compounds selected from the group consisting of lithium cobalt oxide; lithium nickel oxide; lithium manganese oxide; lithium cobalt-nickel oxide; lithium cobalt-manganese oxide; lithium manganese-nickel oxide; lithium cobalt-nickel-manganese oxide; and oxides having other element(s) substituted or doped therein may be further mixed in the composite cathode active material according to the embodiment of the present invention as needed.

The other element(s) may be one or more selected from the group consisting of Al, Mg, Ni, Co, Fe, Cr, V, Ti, Cu, B, calcium (Ca), Zn, zirconium (Zr), niobium (Nb), molybdenum (Mo), strontium (Sr), antimony (Sb), tungsten (W), and bismuth (Bi), but the other element(s) is not limited thereto.

The present invention also provides a secondary battery including the foregoing composite cathode active material.

A typical method known in the art may be used for a method of including the composite cathode active material according to the embodiment of the present invention in the secondary battery and provision of the secondary battery including the composite cathode active material will be described as a non-restrictive example below.

The secondary battery includes a cathode, an anode, a separator, and an electrolyte, and the cathode includes the cathode active material according to the embodiment of the present invention.

A cathode current collector may be coated with a cathode slurry obtained by dispersing the composite cathode active material, a conductive agent, and a binder in a dispersion medium and then, dried to prepare a cathode including the composite cathode active material.

Any conductive agent, binder, dispersion medium, and current collector known in the art may be used so long as the conductive agent, the binder, the dispersion medium, and the current collector are used in lithium secondary batteries.

Non-restrictive examples of the conductive agent may be one or more selected from the group consisting of artificial graphite, natural graphite, carbon black, acetylene black, Ketjen black, Denka black, thermal black, channel black, carbon fibers, metal fibers, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, and polypyrrole.

The conductive agent may be used in an amount ranging from 3 parts by weight to 20 parts by weight based on 100 parts by weight of the composite cathode active material. In the case that a content of the conductive agent is less than 5 parts by weight, electrochemical properties of the battery may deteriorate and in the case that the content thereof is greater than 20 parts by weight, energy density per weight may decrease.

Non-restrictive examples of the binder may be one or more selected from the group consisting of polyvinylidene fluoride (PVdF), a polyhexafluoropropylene-polyvinylidene fluoride copolymer (PVdF/HFP), poly(vinyl acetate), polyvinyl alcohol, polyethylene oxide, polyvinylpyrrolidone, alkylated polyethylene oxide, polyvinyl ether, poly(methyl methacrylate), poly(ethyl acrylate), polytetrafluoroethylene (PTFE), polyvinyl chloride, polyacrylonitrile, polyvinylpyridine, a styrene-butadiene rubber, an acrylonitrile-butadiene rubber, an ethylene-propylene-diene monomer (EPDM) and a mixture thereof.

The binder may be used in an amount ranging from 3 parts by weight to 15 parts by weight based on 100 parts by weight of the composite cathode active material. In the case that a content of the binder is less than 3 parts by weight, adhesion between the electrode active material and the current collector may be insufficient, and in the case that the content of the binder is greater than 15 parts by weight, adhesion may be good, but a capacity of the battery may be decreased because a content of the electrode active material is decreased as much as the content of the binder.

Non-restrictive examples of the dispersion medium may be N-methylpyrrolidone, dimethyl formamide (DMF), dimethyl sulfoxide (DMSO), ethanol, isopropanol, water, and a mixture thereof.

Non-restrictive examples of the cathode current collector may be platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), indium (In) doped $SnO_2$ (ITO), fluorine (F) doped $SnO_2$ (FTO), and an alloy thereof, or stainless steel surface treated with C, Ni, Ti, or Ag.

An anode, a separator, and an electrolyte used in the secondary battery may be used without limitation so long as the anode, the separator, and the electrolyte are used in the art.

Specifically, the anode may be prepared by coating an anode current collector with an anode active material, such as lithium metal, lithium alloys, amorphous carbon, crystal-line carbon, carbon composites, and $SnO_2$, and then drying and rolling the anode current collector.

More particularly, alloys of lithium with metals, such as aluminum, zinc, bismuth, cadmium, antimony, silicon, lead, tin, gallium, or indium, may be used as the lithium alloys.

As the anode current collector, Pt, Au, Pd, Ir, Ag, Ru, Ni, STS, Cu, Mo, Cr, C, Ti, W, ITO, FTO, and an alloy thereof may be used, and Cu or stainless steel surface treated with C, Ni, Ti, or Ag may be also used.

Both of the foregoing cathode current collector and the anode current collector may have a form, such as a foil, a film, a sheet, a punched body, a porous body, or a foamed body.

The separator acts to prevent a short circuit between the cathode and the anode, and to provide a movement path of lithium ions. A known material used in a secondary battery may be used as the separator. Non-restrictive examples of the separator used may be layers of polyolefin-based polymer, such as polypropylene and polyethylene, or multilayers, microporous films, woven fabrics, and nonwoven fabrics thereof.

Carbonate, ester, ether, or ketone may be used alone or in combination as the electrolyte. Dimethyl carbonate, diethyl carbonate, dipropyl carbonate, methylpropyl carbonate, ethylpropyl carbonate, methylethyl carbonate, ethylene carbonate, propylene carbonate, or butylene carbonate may be used as the carbonate, γ-butyrolactone, n-methyl acetate, n-ethyl acetate, or n-propyl acetate may be used as the ester, and dibutyl ether may be used as the ether. However, the present invention is not limited thereto.

A lithium salt may be further added in the electrolyte. A lithium salt known in the art may be used as the lithium salt, but non-restrictive examples of the lithium salt may be $LiBF_4$, $LiPF_6$, $LiAsF_6$, $LiSbF_6$, or $LiPF_3(CF_2CF_3)_3$.

Also, the present invention provides a battery module including secondary batteries including the composite cathode active material by connecting the secondary batteries in series or parallel according to a typical technique of the art.

The number of the secondary batteries included in the battery module may be adjusted in consideration of application and capacity of the battery module.

Further, the present invention provides a battery pack in which the battery modules are electrically connected.

The battery pack may be used as a power source of a medium and large sized device, such as an electric vehicle (EV) including an electric car, a hybrid electric vehicle (HEV), and a plug-in hybrid electric vehicle (PHEV); an electric two-wheeled vehicle including an electric bike and an electric scooter; an electric golf cart; an electric truck; and an electric commercial vehicle, but the present invention is not limited thereto.

Hereinafter, the present invention will be described in more detail, according to specific examples. However, the present invention is not limited thereto.

EXAMPLE 1

90 parts by weight of $(0.5)[Li_2MnO_3].(0.5)[Li(Ni_{0.33}Co_{0.33}Mn_{0.33}O_2)]$ and 10 parts by weight of $Li(Ni_{0.80}Co_{0.15}Al_{0.05}O_2)$ were mixed to prepare a composite cathode active material.

Thereafter, 100 parts by weight of the composite cathode active material, 5 parts by weight of carbon black as a conductive agent, and 5 parts by weight of polyvinylidene fluoride as a binder were added into 1-methyl-2-pyrrolidone to prepare a slurry for preparing a cathode.

Next, an aluminum foil was coated with the slurry and then dried to prepare a cathode. The formation of the cathode was performed by hot rolling at 110° C. and drying in a vacuum oven at 80° C. for 24 hours.

A porous polyethylene separator was disposed between the cathode thus prepared and a graphite-based anode, and a lithium electrolyte was injected to prepare a polymer-type lithium secondary battery.

EXAMPLE 2

A polymer-type lithium secondary battery was prepared in the same manner as Example 1 except that 80 parts by weight of $(0.5)[Li_2MnO_3].(0.5)[Li(Ni_{0.33}Co_{0.33}Mn_{0.33}O_2)]$ and 20 parts by weight of $Li(Ni_{0.80}Co_{0.15}Al_{0.05}O_2)$ were mixed as a composite cathode active material.

EXAMPLE 3

A polymer-type lithium secondary battery was prepared in the same manner as Example 1 except that 70 parts by weight of $(0.5)[Li_2MnO_3].(0.5)[Li(Ni_{0.33}Co_{0.33}Mn_{0.33}O_2)]$ and 30 parts by weight of $Li(Ni_{0.80}Co_{0.15}Al_{0.05}O_2)$ were mixed as a composite cathode active material.

COMPARATIVE EXAMPLE 1

A polymer-type lithium secondary battery was prepared in the same manner as Example 1 except that 100 parts by weight of $(0.5)[Li_2MnO_3].(0.5)[Li(Ni_{0.33}CO_{0.33}Mn_{0.33}O_2)]$ was used instead of a composite cathode active material.

EXPERIMENTAL EXAMPLES (1) Power Evaluation According to State of Charge

Powers according to states of charge (SOCs) of the polymer-type lithium secondary batteries prepared according to Examples 1 to 3 and Comparative Example 1 were measured, and the results thereof are presented in FIG. 1.

(2) Resistance Measurement According to State of Charge

Figure 2:
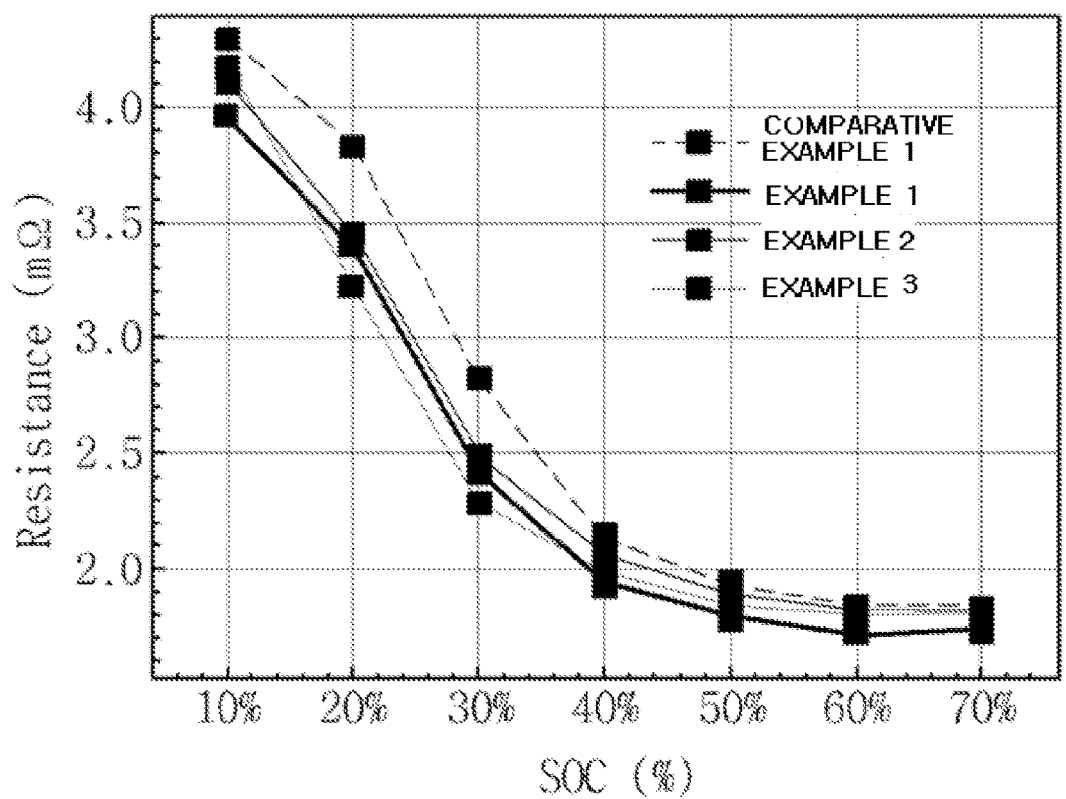
FIG. 2 is a graph showing resistance with respect to each SOC of the cells according to Examples 1 to 3 and Comparative Example 1.

Resistances according to SOCs of the polymer-type lithium secondary batteries prepared according to Examples 1 to 3 and Comparative Example 1 were measured, and the results thereof are presented in FIG. 2.

(3) Charge and Discharge Potential Measurement

Figure 3:
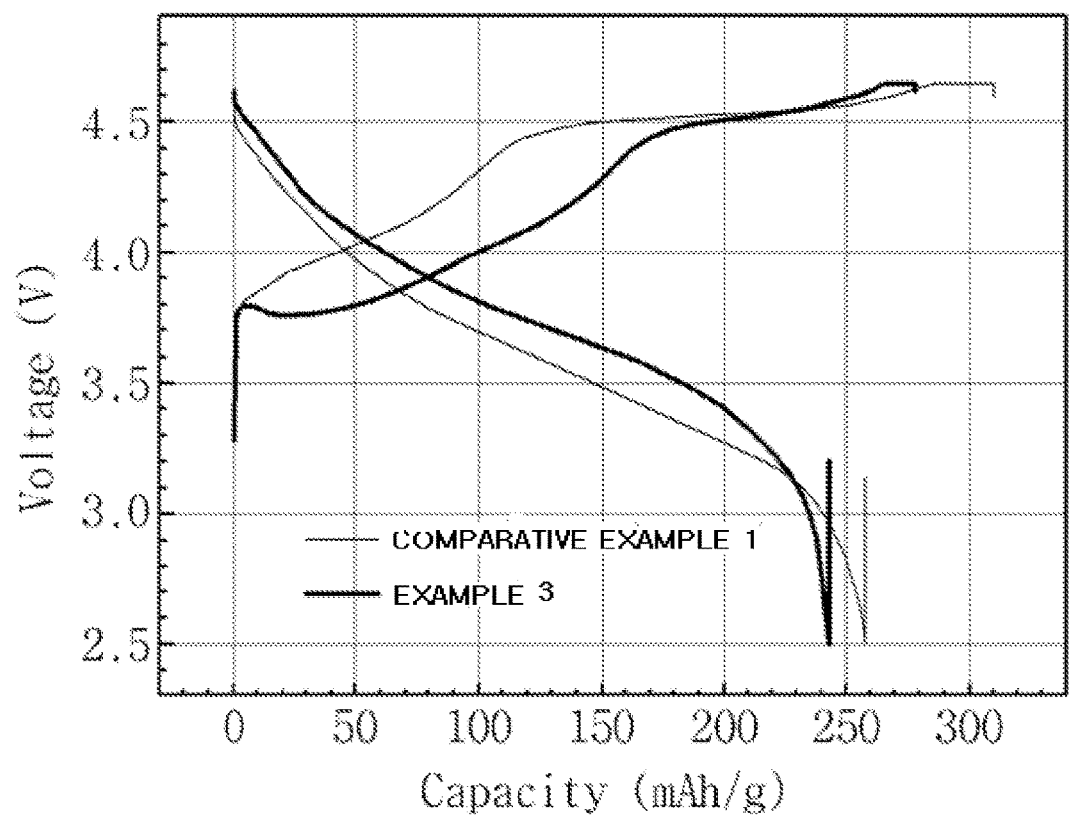
FIG. 3 is a graph showing charge and discharge curves of the cells according to Example 3 and Comparative Example 1.

Charge and discharge potentials of the polymer-type lithium secondary batteries prepared according to Example 3 and Comparative Example 1 were measured, and the results thereof are presented in FIG. 3.

Data presented in the following FIGS. 1 through 3 were merely examples and the specific values thereof may be changed according to specifications of cells and surrounding environments, and thus, relative trends of power, resistance, and charge and discharge potential according to a SOC of each cell may be considered to be important rather than the specific values thereof.

Referring to FIG. 1, with respect to Comparative Example 1, power measured was overall lower than those of Examples 1 to 3. In the case that a SOC is lower than 50%, the power tends to be noticeably decreased and particularly, it may be understood that differences in the powers of the cells according to Comparative Example 1 and Examples 1 to 3 were 10% or more in a SOC range of 20% to 40%.

Referring to FIG. 2, with respect to Comparative Example 1, a resistance value measured was overall greater than those of Examples 1 to 3, and particularly, with respect to Comparative Example 1, it may be confirmed that resistance was rapidly increased in the case that the SOC was low in a range of 10% to 40%. However, with respect to Examples 1 to 3, it may be confirmed that resistances were not rapidly increased as in Comparative Example 1 and the resistance values thereof were also lower than that of Comparative Example 1.

Referring to FIG. 3, a discharge graph of Comparative Example 1 was disposed under that of Example 3 and thus, it may be understood that a discharge potential of the cell including the composite cathode active material of Example 3 was higher than that of the cell including the single cathode active material of Comparative Example 1.

According to the Examples and the Experimental Examples, resistances of the cells including the composite cathode active material according to the present invention may not be rapidly increased at a low SOC, and thus, it may be confirmed that stable power may be secured in a wide SOC range.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

A composite cathode active material of the present invention may not only be non-toxic and economy in terms of costs, but may also provide stable power in a wide SOC range. Also, power characteristics may be improved by using the composite cathode active material according to the present invention in a secondary battery, a battery module, and a battery pack.

The invention claimed is:

1. A composite cathode active material comprising:
   a layered lithium manganese oxide represented by Chemical Formula 1 shown below; and
   a lithium-containing metal oxide represented by Chemical Formula 3 shown below,
   wherein a mixing ratio of the layered lithium manganese oxide represented by Chemical Formula 1 and the lithium-containing metal oxide represented by Chemical Formula 3 is in a weight ratio ranging from 90:10 to 70:30, $$a[Li_2MnO_3] \cdot (1-a)[LiM^1O_2] \quad \text{Chemical Formula 1}$$

wherein, $0<a<1$ and M1 is one or more metals selected from the group consisting of manganese (Mn), nickel (Ni), cobalt (Co), iron (Fe), chromium (Cr), vanadium (V), copper (Cu), zinc (Zn), titanium (Ti), aluminum (Al), magnesium (Mg), and boron (B); and $$Li(Ni_xCo_yAl_z)O_2 \quad \text{Chemical Formula 3}$$

wherein, $0.45 \leq x \leq 0.90$, $0.05 \leq y \leq 0.35$, $0.005 \leq z \leq 0.20$, and $x+y+z=1$.

2. The composite cathode active material of claim 1, wherein $M^1$ in Chemical Formula 1 of the layered lithium manganese oxide includes Mn, Ni, and Co.

3. The composite cathode active material of claim 1, further comprising one or more selected from the group consisting of lithium cobalt oxide; lithium nickel oxide; lithium manganese oxide; lithium cobalt-nickel oxide; lithium cobalt-manganese oxide; lithium manganese-nickel oxide; lithium cobalt-nickel-manganese oxide; and oxides having one or more other elements selected from the group consisting of Al, Mg, Ni, Co, Fe, Cr, V, Ti, Cu, B, calcium (Ca), Zn, zirconium (Zr), niobium (Nb), molybdenum (Mo), strontium (Sr), antimony (Sb), tungsten (W), and bismuth (Bi) substituted or doped therein.

4. A secondary battery comprising the composite cathode active material of claim 1.

5. A battery module comprising the secondary battery of claim 4.

6. A battery pack comprising the battery module of claim 5.

7. The battery pack of claim 6, wherein the battery pack is used as a power source of one or more medium and large sized devices selected from the group consisting of an electric vehicle (EV) including an electric car, a hybrid electric vehicle (HEV), and a plug-in hybrid electric vehicle (PHEV); an electric bike; an electric scooter; an electric golf cart; an electric truck; and an electric commercial vehicle.

* * * * *